United States Patent Office 2,867,544
Patented Jan. 6, 1959

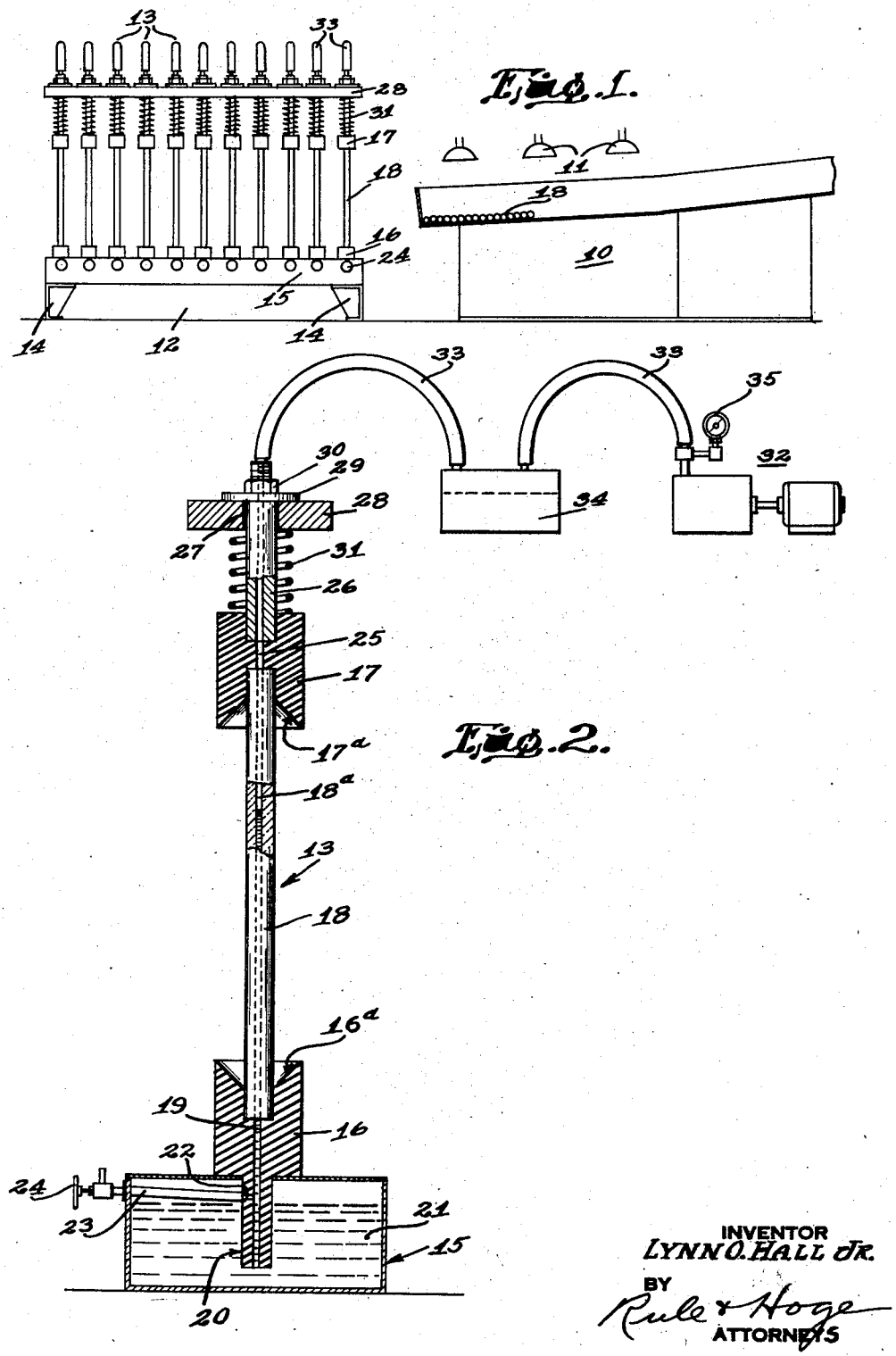

2,867,544

METHOD AND APPARATUS FOR COATING THE INTERIOR SURFACES OF SMALL DIAMETER GLASS TUBING

Lynn O. Hall, Jr., Vineland, N. J., assignor to Owens-Illinois Glass Company, a corporation of Ohio Application February 23, 1956, Serial No. 567,340

5 Claims. (Cl. 117—97)

The present invention is a method and apparatus for coating the interior surfaces of small diameter glass tubing and the like articles with a continuous film, or perhaps completely filling the tube bore with a material capable of imparting a desired color or tint to the glass.

Where the tube bore is of rather small diameter, it is apparent that some difficulty ordinarily would be experienced in introducing a coloring pigment or some other material therein to the end that the entire surface of the bore wall would be uniformly coated. It is also evident that it might be equally difficult to completely fill such a bore with a material such, for example, as an epoxy resin preparation to produce a solid colored core.

An object of my invention is the provision of a simple and effective method and apparatus for introducing a coating material into tubes or openings of small diameter in articles to which one desires to impart color, without actually incorporating a coloring pigment in the material of which the article is made.

Another object of my invention is the provision of a novel method in which one end of a tubular passageway, to the wall surface of which a coloring pigment is to be applied, is connected to a source of liquid coloring material, while the other end of such passageway is connected to a source of vacuum so that the latter functions to draw the coating material from the supply source into the tubular passageway with the result that the surfaces are coated, as desired.

A further object of my invention is the provision of a method of the above character in which flow of the coating material into the tube is terminated at the time desired by introducing atmospheric air at a point between the source of supply of coating material and the tube and wherein the vacuumizing means continues to operate for the purpose of removing any excess coating material and leaving a continuous film of same deposited upon the wall of the tube passageway.

It is also an object of my invention to provide simple and effective apparatus for practicing the above method and to this end I utilize a plurality of chucks arranged in pairs, one chuck of each pair being directly connected to a source of supply of liquid coating material (paint, for example) while the other chuck is connected to a source of vacuum and is shiftable axially to facilitate placement and removal of the articles to be treated.

Other objects will be in part apparent and in part pointed out hereinafter.

In the drawings:

Fig. 1 is a side elevational view with parts in section disclosing the present invention in more or less diagrammatic form.

Fig. 2 is a vertical transverse sectional view with parts in elevation showing one of the several chuck mechanisms and paint or coating material flow control means.

Although the present invention very obviously is adaptable for use in introducing various types of liquid coating materials into small diameter bores of tubing and other articles and perhaps for completely filling such bores with resinous materials to produce a solid core therein, the primary purpose of my invention is to color or tint transparent glass towel bars so as to impart a pleasing appearance thereto. In its broadest aspects, the invention consists in connecting one end of the tubular passageway of the article to a source of supply of liquid paint or such coating material and the other end to a source of vacuum so that paint may be drawn into the tubular passageway to fill the latter and coat the entire inner surface. Upon completion of the filling operation, or substantial filling, air is introduced at a point between the source of supply of paint and the adjacent end of the tubular passageway to thereby terminate the delivery of paint to said passageway, the application of vacuum to said passageway being continued so as to remove excess paint and leave in said passageway only that required to properly coat the wall surfaces.

The apparatus involved comprises a table or magazine 10 upon which the tubes or other articles are stacked and above which heating devices, lamps 11, for example, are positioned to raise the temperature of the tubes to somewhere between about 170° F. and 180° F. These heated tubes are then transferred to the coating apparatus 12 which comprises a plurality of identical units 13 mounted upon supporting means 14. One of these units is disclosed in detail in Fig. 2.

These coating units 13 have a common paint or coating material supply source, such being contained in an elongated horizontal chamber 15. Each of the coating units includes lower and upper chucks 16 and 17, respectively, which are disposed coaxially and securely yet releasably hold the glass tube 18, or other item, in proper position for treatment. These chucks preferably are formed of rubber, or a rubber-like composition, so that they will not damage the ends of the glass tube and, at the same time will effectively grip the exterior surfaces of the article. The lower chuck 16 is formed with an axial conduit 19 extending entirely therethrough and into a reduced neck-like extension 20 which projects into the body or pool of coating material 21. Near the upper end of this neck-like extension 20 is a radial vent opening 22 which is connected to a valved vent pipe 23. The valve 24 is manually operable. It will also be noted that the adjacent ends of the chucks 16 and 17 are formed with conical guiding surfaces 16ª and 17ª designed to facilitate placement of the tubes preparatory to initiating the coating operation.

The upper chuck 17 has an axial opening 25 therethrough communicating with a similar passageway in an extension rod 26, the latter projecting freely through an opening 27 in a head plate 28 with which it is held assembled by means of a washer 29 and nut 30. A coil spring 31 encircling the extension rod 26 and interposed between the chuck 17 and head plate 28 normally yieldingly holds the chuck in its lowermost position, as shown in Fig. 2. Thus, the tube 18, or other article, is firmly yet readily and releasably held in place for treatment.

Flow of the coating material to the passageway or bore 18ª in the tube 18 is obtained simply by exhausting the air from said bore. This is accomplished by a vacuum pump unit 32 which is connected by lengths of hose 33 to the upper end of the extension rod 26. Between the two lengths of hose 33 is a reservoir 34 which collects any excess coating material that may be drawn from the articles supported in the chucks 16 and 17. A vacuum pressure gauge 35 is inserted in the line between the vacuum pump unit and the adjacent length of hose 33.

It is apparent, in view of the above, that the operation of this apparatus involves simply the explained heating of the glass tube and positioning of same in the chucks as shown in Fig. 2, such being accomplished by moving the upper chuck 17 upwardly a distance sufficient to permit alignment of the axes of the passageway in the tube and the conduits in the two chucks. Thereupon the upper chuck is released and the spring 31 operates to effect snug contact between the chucks and the exterior end surfaces of the tube 18. It is understood that at this point in the operating cycle the vent valve 24 is closed. The vacuum pump unit then operates to exhaust the air from the bore 18$^a$ with the result that a quantity of the coating material 21 is drawn upwardly into the bore of the tube. At the proper time interval and, preferably before the column of paint or other material drawn into the bore 18$^a$ has reached the upper end of the latter, the valve 24 is opened to admit atmospheric air through the vent opening 22 into the conduit 19 of the lower chuck 16. The vacuum pump unit continues to operate so that the column of paint already in the bore, or at least a portion thereof moves upwardly and is exhausted through the upper end of the tube and upper chuck. Any such excess paint, as may find its way through the length of hose 33 which is directly connected to the chuck, is collected in the excess color reservoir 34. It is understood, of course, that the timing of the vacuumizing and venting steps preferably is such as to minimize the amount of coating material that passes beyond the upper end of the item being treated. By reason of the tube having been heated as explained, the coating material adheres quite readily to the glass and produces a continuous film, as has been described heretofore.

Modifications may be resorted to within the spirit and scope of the appended claims.

I claim:

1. The method of coating the interior surface of an open ended glass tube with a continuous film of paint or the like material to impart relatively permanent color to the tube, which consists in effecting communication between one end of the tube and a source of supply of the coating material in liquid flowable form, exhausting the air from said tube via the other open end to thereby cause flow of the material to the interior of said tube and effecting communication between the lower end of the tube and the atmosphere to terminate flow of the coating material from the source of supply into said tube prior to complete filling of the tube with said material while continuing the removal of air from said other end of the tube whereby the coating material already delivered to said tube is in part distributed over the theretofore uncoated interior surface and any excess material is removed through said open end by suction.

2. The method defined in claim 1 together with the step of heating the tube prior to effecting communication between it and the source of supply of liquid coating material.

3. The method defined in claim 1 and collecting the removed excess coating material in a reservoir for reuse.

4. Apparatus of a character described comprising upper and lower chucks having axially aligned conduits therethrough, said chucks adapted to support an article having a continuous opening therethrough with the ends of said opening directly communicating with the conduits in said chucks, a source of supply of liquid coating material directly connected to the conduit in the lower chuck, a source of vacuum connected to the conduit in the upper chuck and operable to exhaust the air from the passageway in said article and thereby cause flow of liquid paint to the interior of and in part through the passageway in said article and means for establishing communication between the conduit in the lower chuck and the atmosphere to interrupt the delivery of paint to the tube while application of vacuum to the tube continues to effect distribution of the paint over the theretofore uncoated surfaces of the passageway and the removal of excess paint from the passageway in said article.

5. The apparatus defined in claim 4, the last named means comprising a valved passageway leading from a point intermediate the ends of the conduit to the atmosphere.

References Cited in the file of this patent

UNITED STATES PATENTS

| | | |
|---|---|---|
| 2,123,659 | Pike | July 12, 1938 |
| 2,303,290 | Michael | Nov. 24, 1942 |
| 2,318,060 | Cortese | May 4, 1943 |
| 2,322,729 | Holman | June 22, 1943 |
| 2,392,229 | Cohen | Jan. 1, 1946 |
| 2,412,954 | Zdancewicz | Dec. 24, 1946 |